(12) United States Patent
Karr

(10) Patent No.: US 11,409,447 B1
(45) Date of Patent: Aug. 9, 2022

(54) SYSTEM AND METHOD FOR IMPLEMENTING NON-BLOCKING, CONCURRENT HASH TABLES

(71) Applicant: Travelport, LP, Atlanta, GA (US)

(72) Inventor: Bryan Karr, Fort Collins, CO (US)

(73) Assignee: TRAVELPORT, LP, Atlanta, GA (US)

( * ) Notice: Subject to any disclaimer, the term of this patent is extended or adjusted under 35 U.S.C. 154(b) by 583 days.

(21) Appl. No.: 16/380,744

(22) Filed: Apr. 10, 2019

Related U.S. Application Data

(63) Continuation of application No. 15/374,991, filed on Dec. 9, 2016, now Pat. No. 10,303,383.

(60) Provisional application No. 62/265,006, filed on Dec. 9, 2015.

(51) Int. Cl.
*G06F 3/06* (2006.01)
*G06F 16/22* (2019.01)

(52) U.S. Cl.
CPC .......... *G06F 3/0631* (2013.01); *G06F 3/0607* (2013.01); *G06F 3/0673* (2013.01); *G06F 16/2255* (2019.01)

(58) Field of Classification Search
CPC .. G06F 3/0631; G06F 16/2255; G06F 3/0607; G06F 3/0673; G06F 12/00; G06F 13/00
See application file for complete search history.

(56) References Cited

U.S. PATENT DOCUMENTS

| | | | |
|---|---|---|---|
| 6,144,983 A * | 11/2000 | Klots | G06F 9/52 707/999.008 |
| 9,331,712 B1 * | 5/2016 | Milner | H04N 19/91 |
| 2005/0021506 A1 * | 1/2005 | Sauermann | G06F 16/24537 |
| 2008/0015113 A1 * | 1/2008 | Alpar | G16B 50/00 506/8 |
| 2009/0228514 A1 * | 9/2009 | Liu | G06F 16/8365 |
| 2013/0185421 A1 * | 7/2013 | Yang | H04L 65/1066 709/224 |

\* cited by examiner

*Primary Examiner* — Tuan V Thai
(74) *Attorney, Agent, or Firm* — K&L Gates LLP

(57) ABSTRACT

A computer-implemented method of resizing a data structure includes storing a first hash index comprising x elements, wherein x is a positive integer greater than two, determining that the first hash index needs to expand, allocating a second hash index, wherein the second index contains at least x+1 elements, attempting, by a first thread, to advance a first pointer from the first hash index to the second hash index, attempting, by a second thread, to advance the first pointer from the first hash index to the second hash index, where only one of the first thread or the second thread will advance the first pointer based on an atomic operation.

1 Claim, 31 Drawing Sheets

```
#define BLOCK_COUNT 14
define NULL_BLOCK 0xffffffffffffffff typedef struct cache_line_block
{
    int64_t   updates;
    int64_t   bit_map;
    intptr_t  items[BLOCK_COUNT];
} cblock_t;

typedef struct hash_index
{
    struct hash_index *next;
    void *null;
    int64_t size;
    int64_t capacity;
    int64_t shifts;
    int64_t t_index;
    char    pad[CACHE_LINE_SIZE - (2 * sizeof(void*)) - (4 * sizeof(int64_t))];
    cblock_t blocks[1];
} hash_index_t;

typedef struct hash_set
{
    hash_index_t *head;
    hash_index_t *read;
    hash_index_t *write;
    int64_t accessors;
    int64_t size;
} hash_set_t;
```

FIG. 2

```
g_status_t hash_set_create(hash_set_t **set) {
    if (set == NULL) {
        return ERR_INVALID_ARGUMENT;
    }

*set = calloc(1, sizeof(hash_set_t));
    if (*set == NULL) {
        return ERR_NOMEM;
    }

(*set)->head = calloc(1, (sizeof(hash_index_t) + 3 * sizeof(cblock_t)));
    if ((*set)->head == NULL) {
        hash_set_release(set);
        return ERR_NOMEM;
    }
    (*set)->head->capacity = 4;
    (*set)->head->shifts = __builtin_ctz((*set)->head->capacity);
    (*set)->write = (*set)->head;
    (*set)->read = (*set)->head;

return SUCCESS;
} g_status_t hash_set_release(hash_set_t **set) {
    if (set == NULL || *set == NULL) {
        return ERR_INVALID_ARGUMENT;
    } hash_index_t *index;

while ((*set)->head != NULL) {
        index = (*set)->head;
        (*set)->head = (*set)->head->next;
        free(index);
    } free(*set);
    *set = NULL;

return SUCCESS;
}
```

FIG. 6

```
g_status_t hash_set_add(hash_set_t *set, intptr_t value) {

A01:    g_status_t result = RETRY;
A02:    hash_index_t *index;
A03:    hash_index_t *head;
A04:    hash_index_t *next;
A05:
A06:    if (set == NULL || memory == NULL) {
A07:        return ERR_INVALID_ARGUMENT;
A08:    }
A09:
A10:    AFA(&set->accessors, 1);
A11:    result = internal_add(set, value, NULL, NULL, NULL);
A12:    if (SUCCESSFUL(result)) {
A13:        AFA(&set->size, 1);
A14:    }
A15:    if (result == UPDATE_CONFLICT) {
A16:        result = SUCCESS;
A17:    }
A18:
A19:    index = set->read;
A20:    next = index->next;
A21:    if (next != NULL) {
A22:        if (index->null != NULL && index->size != 0) {
A23:            // transfer a block
A24:            transferBlock(set);
A25:        }
A26:    }
A27:    AFS(&set->accessors, 1);
A28:
A29:    if (set->accessors == 0) {
A30:        // advance start if needed
A31:        if (next != NULL) {
A32:            if (index->null != NULL && index->size == 0) {
A33:                CAS((uint64_t*)&set->read, (uint64_t)index, (uint64_t)next);
A34:            }
A35:        }
A36:        // advance head if needed
A37:        head = set->head;
A38:        if (head != set->read) {
A39:            // advance head if possible
A40:            next = head->next;
A41:            if (CAS((uint64_t*)&set->head, (uint64_t)head, (uint64_t)next)) {
A42:                free(head);
A43:            }
A44:        }
A45:    }
A46:
A47:    return result;
A48: }
```

FIG. 7

```
q_status_t internal_add(hash_set_t *set, intptr_t value, void ***location, cblock_t **cblock, int64_t *cmask)
{
101:    q_status_t result = NOT_FOUND;
102:    hash_index_t *index, *current, *successor, *next;
103:    cblock_t *block;
104:    int i, empty;
105:    DWORD before, after;
106:    int64_t blk_idx, mask, position;
107:    while (true) {
108:        index = set->write;
109:        result = NOT_FOUND;
110:        do {
111:            blk_idx = computeBlockIndex(index, value);
112:            block = &index->blocks[blk_idx];
113:            before.low = block->updates;
114:            before.high = block->bit_map;
115:            current = index;
116:            empty = -1;
117:            mask = 1;
118:            position = 0;
119:            for (i = 0; i < BLOCK_COUNT; i++) {
120:                if (mask & block->bit_map) {
121:                    if (block->items[i] == value)
122:                        return UPDATE_CONFLICT;
123:                } else if (empty < 0 && block->items[i] == index->null) {
124:                    empty = i;
125:                    position = mask;
126:                }
127:                mask <<= 1;
128:            }
129:            index = index->next;
130:        } while (result == NOT_FOUND && index != NULL);
131:        if (empty >= 0) {
132:            if (!CAS((uint64_t*)&block->items[empty], (uint64_t)current->null, (uint64_t)value))
133:                continue;
134:            after.low = before.low + 1;
135:            after.high = (before.high | position);
136:            before.high |= (uint64_t)current->null;
137:            if (!DWCAS((DWORD*)&block->updates, (DWORD*)&before, (DWORD*)&after)) {
138:                block->items[empty] = NULL;
139:                continue;
140:            }
141:            AFA(&current->size, 1);
142:            if (location)
143:                *location = &block->items[empty];
144:            if (cblock)
145:                *cblock = block;
146:            if (cmask)
147:                *cmask = position;
148:            return SUCCESS;
149:        }
150:        // overflow to expanded hash index
151:        CAS((uint64_t*)&current->null, (uint64_t)NULL, (uint64_t)NULL_BLOCK);
152:        successor = calloc(1, (sizeof(hash_index_t) + ((current->capacity << 1) - 1) * sizeof(cblock_t)));
153:        if (successor != NULL) {
154:            successor->capacity = current->capacity << 1;
155:            successor->shifts = __builtin_ctz(successor->capacity);
156:            next = current->next;
157:            if (next == NULL) {
158:                if (CAS((uint64_t*)&current->next, (uint64_t)next, (uint64_t)successor))
159:                    CAS((uint64_t*)&set->write, (uint64_t)current, (uint64_t)successor);
160:                else
161:                    free(successor);
162:            } else {
163:                CAS((uint64_t*)&set->write, (uint64_t)current, (uint64_t)next);
164:                free(successor);
165:            }
166:        } else
167:            return ERR_NOMEM;
168:    }
169:    return result;
170:}
```

FIG. 8

```
int64_t computeBlockIndex(hash_index_t *index, intptr_t value) {
C01:    int64_t result = (int64_t)value;
C02:    int64_t shifter = result >> index->shifts;
C03:
C04:    while (shifter) {
C05:        result ^= shifter;
C06:        shifter >>= index->shifts;
C07:    }
C08:    return (result & (index->capacity - 1));
C09: }
```

FIG. 9

```
void transferBlock(hash_set_t *set) {
T01:    g_status_t result;
T02:    int i;
T03:    int64_t t_index;
T04:    int64_t mask;
T05:    int64_t alt_mask;
T06:    hash_index_t *read;
T07:    cblock_t *block;
T08:    cblock_t *alt_block;
T09:    intptr_t value;
T10:    void **alt_location;
T11:    DWORD before;
T11:    DWORD after;
T12:
T13:    read = set->read;
T14:    if (read != set->write) {
T15:        if (read->size == 0)
T16:            return;
T17:
T18:        t_index = AFA(&read->t_index, 1) & (read->capacity - 1);
T19:        block = &read->blocks[t_index];
T20:        if (!block->bit_map)
T21:            return;
T22:
T23:        mask = 1;
T24:        for (i = 0; i < BLOCK_COUNT; i++) {
T25:            before.low = block->updates;
T26:            before.high = block->bit_map;
T27:            value = block->items[i];
T28:            if (!(mask & before.high)) {
T29:                mask <<= 1;
T30:                continue;
T31:            }
T32:            if (!value) {
T33:                mask <<= 1;
T34:                continue;
T35:            }
T37:            result = internal_add(set, value, &alt_location, &alt_block, &alt_mask);
T38:            if (!SUCCESSFUL(result)) {
T39:                mask <<= 1;
T40:                continue;
T41:            }
T42:            after.low = before.low + 1;
T43:            after.high = (before.high & ~mask);
T44:            if (!DWCAS((DWORD*)&block->updates, (DWORD*)&before, (DWORD*)&after)) {
T45:                // delete copy from new location
T46:                do {
T47:                    before.low = alt_block->updates;
T48:                    before.high = alt_block->bit_map;
T49:                    after.low = before.low + 1;
T50:                    after.high = (before.high & ~alt_mask);
T51:                } while (!DWCAS((DWORD*)&alt_block->updates, (DWORD*)&before, (DWORD*)&after));
T52:                *alt_location = NULL;
T53:                return;
T54:            }
T55:            block->items[i] = NULL;
T56:            AFS(&read->size, 1);
T57:            mask <<= 1;
T58:        }
T58:    }
T59:}
```

FIG. 10

```
bool hash_set_has_value(hash_set_t *set, intptr_t value) {
N01:    bool result = false;
N02:    hash_index_t *index;
N03:    hash_index_t *head;
N04:    hash_index_t *next;
N05:    int64_t blk_idx;
N06:    cblock_t *block;
N07:    int i;
N08:    int64_t mask;
N09:
N10:    if (set == NULL || memory == NULL)
N11:        return result;
N12:
N13:    AFA(&set->accessors, 1);
N14:    index = set->read;
N15:    do {
N16:        blk_idx = computeBlockIndex(index, value);
N17:        block = &index->blocks[blk_idx];
N18:        mask = 1;
N19:        for (i = 0; i < BLOCK_COUNT; i++) {
N20:            if (mask & block->bit_map) {
N21:                if (block->items[i] == value) {
N22:                    result = true;
N23:                    break;
N24:                }
N25:            }
N26:            mask <<= 1;
N27:        }
N28:        index = index->next;
N29:    } while (!result && index != NULL);
N30:
N31:    index = set->read;
N32:    next = index->next;
N33:    if (next != NULL) {
N34:        if (index->null != NULL && index->size != 0) {
N35:            // transfer a block
N36:            transferBlock(set);
N37:        }
N38:    }
N39:    AFS(&set->accessors, 1);
N40:
N41:    if (set->accessors == 0) {
N42:        // advance start if needed
N43:        if (next != NULL) {
N44:            if (index->null != NULL && index->size == 0) {
N45:                CAS((uint64_t*)&set->read, (uint64_t)index, (uint64_t)next);
N46:            }
N47:        }
N48:        // advance head if needed
N49:        head = set->head;
N50:        if (head != set->read) {
N51:            // advance head if possible
N52:            next = head->next;
N53:            if (CAS((uint64_t*)&set->head, (uint64_t)head, (uint64_t)next)) {
N54:                free(head);
N55:            }
N56:        }
N57:    }
N58:
N59:    return result;
N60: }
```

FIG. 11

```
g_status_t hash_set_remove(hash_set_t *set, intptr_t value) {
R01:    g_status_t result = NOT_FOUND;
R02:    hash_index_t *index, *head, *next;
R03:    cblock_t *block;
R04:    int64_t blk_idx, mask;
R05:    int i;
R06:    DWORD before, after;
R07:
R08:    if (set == NULL || memory == NULL)
R09:        return result;
R10:
R11:    AFA(&set->accessors, 1);
R12:    index = set->read;
R13:    do {
R14:        blk_idx = computeBlockIndex(index, value);
R15:        block = &index->blocks[blk_idx];
R16:        before.low = block->updates;
R17:        before.high = block->bit_map;
R18:        mask = 1;
R19:        for (i = 0; i < BLOCK_COUNT; i++) {
R20:            if (mask & block->bit_map) {
R21:                if (block->items[i] == value) {
R22:                    after.low = before.low + 1;
R23:                    after.high = (before.high & ~mask);
R24:                    if (!DWCAS((DWORD*)&block->updates, (DWORD*)&before, (DWORD*)&after)) {
R25:                        before.low = block->updates;
R26:                        before.high = block->bit_map;
R27:                        i = -1;
R28:                        mask = 1;
R29:                        continue;
R30:                    }
R31:                    block->items[i] = NULL;
R32:                    AFS(&set->size, 1);
R33:                    AFS(&index->size, 1);
R34:                    result = SUCCESS;
R35:                    break;
R36:                }
R37:            }
R38:            mask <<= 1;
R39:        }
R40:        index = index->next;
R41:    } while (result != SUCCESS && index != NULL);
R42:
R43:    index = set->read;
R44:    next = index->next;
R45:    if (next != NULL) {
R46:        if (index->null != NULL && index->size != 0) {
R47:            // transfer a block
R48:            transferBlock(set);
R49:        }
R50:    }
R51:    AFS(&set->accessors, 1);
R52:
R53:    if (set->accessors == 0) {
R54:        // advance start if needed
R55:        if (next != NULL) {
R56:            if (index->null != NULL && index->size == 0) {
R57:                CAS((uint64_t*)&set->read, (uint64_t)index, (uint64_t)next);
R58:            }
R59:            // advance head if needed
R60:            head = set->head;
R61:            if (head != set->read) {
R62:                // advance head if possible
R63:                next = head->next;
R64:                if (CAS((uint64_t*)&set->head, (uint64_t)head, (uint64_t)next)) {
R65:                    free(head);
R66:                }
R67:        }
R68:
R69:    return result;
R70: }
```

FIG. 12

```
enum constants {
    SIZE = 0, ALLOC = 1, NEXT = 2, READ = 3, TAIL = 4, START = 5, BLOCK_COUNT = 15, NODE_SIZE = 34,
};

typedef union hash_ref {
    uint64_t value;
    uint8_t  bytes[sizeof(uint64_t)];
} hash_ref_t;

typedef struct pair_buffer {
    struct pair_buffer *next;
    int64_t            padding;
    int64_t            max;
    int64_t            current;
    int64_t            pad_array[4];
} pair_buffer_t;

typedef struct pair_ref {
    struct pair_ref *next;
    int64_t         count;
    void            *value;
    int64_t         version;
    uint8_t         *key;
    int64_t         refs;
    int64_t         length;
    int64_t         padding;
} pair_ref_t;

typedef struct pair_list {
    pair_ref_t *head;
    int64_t head_count;
    pair_ref_t *tail;
    int64_t tail_count;
} pair_list_t;

typedef union block_cntrl {
    uint64_t bits;
    struct {
        uint32_t version;
        uint32_t bit_map;
    };
} block_cntrl_t;

typedef struct cache_line_block {
    block_cntrl_t cntrl;
    pair_ref_t *items[BLOCK_COUNT];
} cblock_t;

typedef struct hash_index {
    struct hash_index *next;
    void *null;
    int64_t size;
    int64_t capacity;
    int64_t t_index;
    char    pad[CACHE_LINE_SIZE - (2 * sizeof(void*)) - (3 * sizeof(int64_t))];
    cblock_t blocks[1];
} hash_index_t;

typedef struct hash_map {
    int64_t accessors;
    hash_index_t head;
    hash_index_t start;
    hash_index_t end;
    pair_list_t avail;
    pair_list_t defer;
    int64_t size;
    pair_buffer_t *kv_buffer;
} hash_map_t;
```

FIG. 13

```
g_status_t hash_init(hash_map_t *map){
    map->head = calloc(1, (sizeof(hash_index_t) + (HASH_INIT_CAP - 1) * sizeof(cblock_t)));
    if (map->head == NULL) {
        return ERR_NOMEM;
    }
    map->version = 1;
    map->head->capacity = HASH_INIT_CAP;
    map->end = map->head;
    map->start = map->head;

return SUCCESS;
} g_status_t hash_map_create(hash_map_t **map) {
    g_status_t result = SUCCESS;
    int size = sizeof(struct hash_map);

if (map == NULL)
        return ERR_INVALID_ARGUMENT;
    *map = calloc(1, size);
    if (*map == NULL)
        return ERR_NOMEM;
    (*map)->impl = impl;
    result = hash_init(*map);
    if (result != SUCCESS)
        hash_map_release(map);
    return result;
} g_status_t hash_map_release(hash_map_t **map) {
    g_status_t result = SUCCESS;
    if (map == NULL || *map == NULL)
        return ERR_INVALID_ARGUMENT;
    result = hash_release(*map);
    free(*map);
    *map = NULL;

return result;
} g_status_t hash_release(hash_map_t *map) {
    hash_index_t *index;
    pair_buffer_t *buffer;
    pair_ref_t *ref;
    int i;

while (map->head != NULL) {
        index = map->head;
        map->head = map->head->next;
        free(index);
    } while (map->kv_buffer != NULL) {
        buffer = map->kv_buffer;
        ref = (pair_ref_t*)((char*)buffer + sizeof(pair_buffer_t));
        for (i = 0; i < buffer->max; i++) {
            if (ref->key)
                free(ref->key);
            ref = (pair_ref_t*)((char*)ref + sizeof(pair_ref_t));
        }
        map->kv_buffer = buffer->next;
        free(buffer);
    } return SUCCESS;
}
```

FIG. 15

```
int64_t compute_block_index(hash_index_t *index, uint8_t *key, int length)
{
    uint64_t hash = 0;

hash = hashlittle(key, length, index->capacity); // lookup3 hash by Bob Jenkins, 2006 return (int64_t)(hash & (index->capacity - 1));
}
```

FIG. 16

```
typedef struct map_result { q_status_t status;
    int64_t state;
    void *value;
} map_result_t;
```

FIG. 17

```
map_result_t hash_put(hash_map_t *map, uint8_t *key, int64_t length, void *value) {
P01:    map_result_t result = {0};
P02:    hash_index_t *index, *current;
P03:    cblock_t *block;
P04:    int64_t blk_idx;
P05:    block_cntrl_t before, after;
P06:    int i;
P07:    int empty = -1;
P08:    int64_t mask, position;
P09:    pair_ref_t *ref;
P10:
P11:    AFA(&map->accessors, 1);
P12:    while (true) {
P13:        index = map->start;
P14:        result.status = NOT_FOUND;
P15:        // look for existing match
P16:        do {
P17:            blk_idx = compute_block_index(index, key, length);
P18:            block = &index->blocks[blk_idx];
P19:            before = block->cntrl;
P20:            current = index;
P21:            empty = -1; mask = 1; position = 0;
P22:            for (i = 0; i < BLOCK_COUNT; i++) {
P23:                if (mask & block->cntrl.bit_map) {
P24:                    ref = block->items[i];
P25:                    if (ref) {
P26:                        result = update_existing(map, ref, key, length, value, 0);
P27:                        if (result.status != NOT_FOUND)
P28:                            break;
P29:                    }
P30:                } else if (empty < 0 && block->items[i] == index->null) {
P31:                    empty = i;
P32:                    position = mask;
P33:                }
P34:                mask <<= 1;
P35:            }
P36:            index = index->next;
P37:        } while (result.status == NOT_FOUND && index != NULL);
P38:        if (SUCCESSFUL(result.status))
P39:            break;
P40:        if (result.status == RETRY)
P41:            continue;
P42:        // pre-existing item not found, attempt to update empty slot
P43:        if (empty >= 0) {
P44:            pair_ref_t *ref = allocate_ref(map, key, length, value, -1);
P45:            if (ref == NULL) {
P46:                result.status = ERR_NOMEM;
P47:                break;
P48:            }
P49:
P50:            if (!CAS((uint64_t*)&block->items[empty], (uint64_t)current->null, (uint64_t)ref)) {
P51:                free_key_value(map, ref);
P52:                continue;
P53:            }
P54:            after.version = before.version + 1;
P55:            after.bit_map = (before.bit_map | position);
P56:            if (current->null || !CAS((uint64_t*)&block->cntrl, before.bits, after.bits)) {
P57:                block->items[empty] = NULL;
P58:                free_key_value(map, ref);
P59:                continue;
P60:            }
P61:            AFA(&current->size, 1);
P62:            result.status = SUCCESS;
P63:            result.state = ref->version;
P64:            break;
P65:        }
P66:        // no empty slot, overflow to expanded hash index
P67:        result.status = expand_index(map, current);
P68:        if (result.status == ERR_NOMEM)
P69:            break;
P70:    }
P71:    check_resize(map);
P72:    AFS(&map->accessors, 1);
P73:    check_index_list(map);
P74:    return result;
P75:}
```

FIG. 18

```
map_result_t update_existing(hash_map_t *map, pair_ref_t *ref, uint8_t *key, int64_t length, void *value,
int64_t state) {
U01:    map_result_t result = {.status = NOT_FOUND, .state = 0, .value = 0};
U02:    uint8_t *alt_key;
U03:    int64_t alt_length;
U04:    DWORD before;
U05:    DWORD after;
U06:
U07:    AFA(&ref->refs, 1);
U08:    alt_length = ref->length;
U09:    alt_key = ref->key;
U10:    if (alt_key)
U11:    {
U12:        if (length == alt_length && memcmp(key, alt_key, length) == 0)
U13:        {
U14:            if (state > 0 && state != ref->version)
U15:            {
U16:                result.status = UPDATE_CONFLICT;
U17:                result.state = ref->version;
U18:            }
U19:            else
U20:            {
U21:                result.status = RETRY;
U22:                before.low = (uint64_t)ref->value;
U23:                before.high = ref->version;
U24:                after.low = (uint64_t)value;
U25:                after.high = before.high + 1;
U26:                if (DWCAS((DWORD*)&ref->value, (DWORD*)&before, (DWORD*)&after))
U27:                {
U28:                    result.value = (void*)before.low;
U29:                    result.state = after.high;
U30:                    result.status = SUCCESS;
U31:                }
U32:            }
U33:        }
U34:    }
U35:    AFS(&ref->refs, 1);
U36:    return result;
U37: }
```

FIG. 19

```
pair_ref_t *allocate_key_value(hash_map_t *map) {
A01:    pair_ref_t *result = NULL;
A02:    pair_buffer_t *new_buffer;
A03:    pair_buffer_t *buffer;
A04:    int64_t capacity;
A05:    int64_t slot;
A06:
A07:    while(true) {
A08:        buffer = map->kv_buffer;
A09:        if (buffer) {
A10:            if (map->defer.head)
A11:                transfer_deferred(map);
A12:            slot = buffer->current;
A13:            if (slot < buffer->max) {
A14:                if (CAS((uint64_t*)&buffer->current, (uint64_t)slot, (uint64_t)slot + 1)) {
A15:                    result = (pair_ref_t*)((slot * sizeof(pair_ref_t)) + ((char*)buffer +
A16:                            sizeof(pair_buffer_t)));
A17:                    break;
A18:                }
A19:                continue;
A20:            }
A21:            result = map->avail.head;
A22:            if (result && result != map->avail.tail) {
A23:                if (list_remove(&map->avail, result) != NULL) {
A24:                    memset(result, 0, sizeof(pair_ref_t));
A25:                    break;
A26:                }
A27:                continue;
A28:            }
A29:        }
A30:        result = NULL;
A31:        capacity = map->end->capacity * BLOCK_COUNT;
A32:        new_buffer = calloc(1, (sizeof(pair_ref_t) * capacity) + sizeof(pair_buffer_t));
A33:        if (!new_buffer)
A34:            break;
A35:        new_buffer->max = capacity;
A36:        new_buffer->next = buffer;
A37:        if (!CAS((uint64_t*)&map->kv_buffer, (uint64_t)buffer, (uint64_t)new_buffer))
A38:            free(new_buffer);
A39:    }
A40:    return result;
A41: }
```

FIG. 20

```
void transfer_deferred(hash_map_t *map) {
D01:    DWORD before;
D02:    DWORD after;
D03:    uint8_t *key;
D04:    pair_ref_t *ref;
D05:
D06:    while(true) {
D07:        ref = map->defer.head;
D08:        if (!ref || ref->refs != 0 || ref == map->defer.tail)
D09:            break;
D10:        key = ref->key;
D11:        if (key) {
D12:            before.low = (uint64_t)key;
D13:            before.high = 0;
D14:            after.low = 0;
D15:            after.high = 0;
D16:            if (DWCAS((DWORD*)&ref->key, (DWORD*)&before, (DWORD*)&after)) {
D17:                ref->value = NULL;
D18:                ref->version = 0;
D19:                ref->length = 0;
D20:
D21:                free(key);
D22:            }
D23:        }
D24:        if (list_remove(&map->defer, ref) != NULL) {
D25:            free_key_value(map, ref);
D26:            break;
D27:        }
D28:    }
D29:}
```

FIG. 21

```
pair_ref_t *list_remove(pair_list_t *list, pair_ref_t *ref) {
    pair_ref_t *result = NULL;
    DWORD before, after;
    if (ref && ref != list->tail) {
        before.low = (uint64_t)ref;
        before.high = list->head_count;
        after.low = (uint64_t)ref->next;
        after.high = ref->count;
        if (after.low && DWCAS((DWORD*)&list->head, (DWORD*)&before, (DWORD*)&after)) {
            result = ref;
            ref->next = NULL;
            ref->count = 0;
        }
    }
    return result;
} void list_add(pair_list_t *list, pair_ref_t *ref) {
    DWORD before, after;
    pair_ref_t *next;
    ref->next = NULL;
    ref->count = 0;
    while(true) {
        next = list->tail;
        if (next != NULL) {
            before.low = 0;
            before.high = 0;
            after.low = (uint64_t)ref;
            after.high = list->tail_count + 1;
            if (DWCAS((DWORD*)next, (DWORD*)&before, (DWORD*)&after)) {
                before.low = (uint64_t)next;
                before.high = after.high - 1;
                DWCAS((DWORD*)&list->tail, (DWORD*)&before, (DWORD*)&after);
                break;
            } else {
                before.low = (uint64_t)next;
                before.high = after.high - 1;
                after.low = (uint64_t)next->next;
                after.high = next->count;
                DWCAS((DWORD*)&list->tail, (DWORD*)&before, (DWORD*)&after);
            }
        } else {
            before.low = 0;
            before.high = 0;
            after.low = (uint64_t)ref;
            after.high = 1;
            if (DWCAS((DWORD*)&list->tail, (DWORD*)&before, (DWORD*)&after))
            {
                DWCAS((DWORD*)&list->head, (DWORD*)&before, (DWORD*)&after);
            }
            break;
        }
    }
} void free_key_value(hash_map_t *map, pair_ref_t *ref) {
F01:    uint8_t *key;
F02:    DWORD before, after;
F03:    key = ref->key;
F04:    before.low = (uint64_t)key;
F05:    before.high = 0;
F06:    after.low = 0;
F07:    after.high = 0;
F08:    if (DWCAS((DWORD*)&ref->key, (DWORD*)&before, (DWORD*)&after)) {
F09:        ref->value = NULL;
F10:        ref->version = 0;
F11:        ref->length = 0;
F12:
F13:        free(key);
F14:
F15:        list_add(&map->avail, ref);
F16:    } else {
F17:        list_add(&map->defer, ref);
F18:    }
F19:}
```

FIG. 22

```
void check_resize(hash_map_t *map) {
S01:    hash_index_t *index, *next;
S02:    index = map->start;
S03:    next = index->next;
S04:    if (next != NULL) {
S05:        if (index->null != NULL) {
S06:            if (index->size != 0) {
S07:                // transfer a block
S08:                transfer_block(map);
S09:            }
S10:        }
S11:    }
S12:}
```

FIG. 23

```
typedef struct rehash_result {
    g_status_t status;
    cblock_t *block;
    int64_t mask;
    int64_t index;
} rehash_result_t;

void transfer_block(hash_map_t *map) {
T01:    rehash_result_t result;
T02:    int i;
T03:    int64_t t_index;
T04:    hash_index_t *read;
T05:    cblock_t *block;
T06:    void *value;
T07:    int64_t mask;
T08:    block_cntrl_t before;
T09:    block_cntrl_t after;
T10:
T11:    read = map->start;
T12:    if (read != map->end) {
T13:        if (read->size == 0)
T14:            return;
T15:
T16:        t_index = AFA(&read->t_index, 1) & (read->capacity - 1);
T17:        block = &read->blocks[t_index];
T18:        if (!block->cntrl.bit_map)
T19:            return;
T20:        mask = 1;
T21:        for (i = 0; i < BLOCK_COUNT; i++) {
T22:            value = block->items[i];
T23:            before = block->cntrl;
T24:            if (!(mask & before.bit_map)) {
T25:                mask <<= 1;
T26:                continue;
T27:            }
T28:            if (!value) {
T29:                mask <<= 1;
T30:                continue;
T31:            }
T32:            result = rehash(map, value);
T33:            if (!SUCCESSFUL(result.status)) {
T34:                mask <<= 1;
T35:                continue;
T36:            }
T37:            after.version = before.version + 1;
T38:            after.bit_map = (before.bit_map & ~mask);
T39:            if (!CAS((uint64_t*)&block->cntrl, before.bits, after.bits)) {
T40:                // delete copy from new location
T41:                do {
T42:                    before = result.block->cntrl;
T43:                    after.version = before.version + 1;
T44:                    after.bit_map = (before.bit_map & ~result.mask);
T45:                } while (!CAS((uint64_t*)&result.block->cntrl, before.bits, after.bits));
T46:                result.block->items[result.index] = NULL;
T47:                return;
T48:            }
T49:            block->items[i] = NULL;
T50:            AFS(&read->size, 1);
T51:            mask <<= 1;
T52:        }
T53:    }
T54:}
```

```
g_status_t expand_index(hash_map_t *map, hash_index_t *current) {
E01:    hash_index_t *next, *successor;
E02:    CAS((uint64_t*)&current->null, (uint64_t)NULL, (uint64_t)NULL_BLOCK);
E03:    successor = calloc(1, sizeof(hash_index_t) + ((current->capacity << 1) - 1) * sizeof(cblock_t));
E04:    if (successor == NULL)
E05:        return ERR_NOMEM;
E06:    successor->capacity = current->capacity << 1;
E07:    next = current->next;
E08:    if (next == NULL) {
E09:        if (CAS((uint64_t*)&current->next, (uint64_t)next, (uint64_t)successor))
E10:            CAS((uint64_t*)&map->end, (uint64_t)current, (uint64_t)successor);
E11:        else
E12:            free(successor);
E13:    } else {
E14:        CAS((uint64_t*)&map->end, (uint64_t)current, (uint64_t)next);
E15:        free(successor);
E16:    }
E17:    return SUCCESS;
E18:}
```

FIG. 26

```
void check_index_list(hash_map_t *map) {
L01:    hash_index_t *index, *next, *head;
L02:    index = map->start;
L03:    next = index->next;
L04:    if (map->accessors == 0) {
L05:        // advance start index if possible
L06:        if (next != NULL) {
L07:            if (index->null != NULL) {
L08:                if (index->size == 0)
L09:                    CAS((uint64_t*)&map->start, (uint64_t)index, (uint64_t)next);
L10:            }
L11:        }
L12:        // clean up old indexes safely
L13:        head = map->head;
L14:        if (head != map->start) {
L15:            next = head->next;
L16:            if (CAS((uint64_t*)&map->head, (uint64_t)head, (uint64_t)next))
L17:                free(head);
L18:        }
L19:    }
L20:}
```

FIG. 27

```
map_result_t hash_get(hash_map_t *map, uint8_t *key, int64_t length) {
G01:    map_result_t result = {.status = NOT_FOUND, .state = 0, .value = 0};
G02:    hash_index_t *index;
G03:    hash_index_t *head;
G04:    hash_index_t *next;
G05:    int64_t blk_idx;
G06:    cblock_t *block;
G07:    int i;
G08:    int64_t mask;
G09:
G10:    AFA(&map->accessors, 1);
G11:    index = map->start;
G12:    do {
G13:        blk_idx = compute_block_index(index, key, length);
G14:        block = &index->blocks[blk_idx];
G15:        mask = 1;
G16:        for (i = 0; i < BLOCK_COUNT; i++) {
G17:            if (mask & block->cntrl.bit_map) {
G18:                pair_ref_t *ref = block->items[i];
G19:                if (ref) {
G20:                    result = compare_keys(ref, key, length);
G21:                    if (SUCCESSFUL(result.status)) {
G22:                        break;
G23:                    }
G24:                }
G25:            }
G26:            mask <<= 1;
G27:        }
G28:        index = index->next;
G29:    } while (!SUCCESSFUL(result.status) && index != NULL);
G30:
G31:    check_resize(map);
G32:
G33:    AFS(&map->accessors, 1);
G34:
G35:    check_index_list(map);
G36:    return result;
G37:}
```

FIG. 28

```
map_result_t compare_keys(pair_ref_t *ref, uint8_t *key, int length) {
C01:    map_result_t result = {.status = NOT_FOUND, .state = 0, .value = 0};
C02:    uint8_t *alt_key;
C03:    int64_t alt_length;
C04:
C05:    AFA(&ref->refs, 1);
C06:    alt_length = ref->length;
C07:    alt_key = ref->key;
C08:    if (alt_key) {
C09:        if (length == alt_length && memcmp(key, alt_key, length) == 0) {
C10:            result.value = ref->value;
C11:            if (result.value) {
C12:                result.state = ref->version;
C13:                result.status = SUCCESS;
C14:            }
C15:        }
C16:    }
C17:    AFS(&ref->refs, 1);
C18:    return result;
C19:}
```

FIG. 29

```
map_result_t hash_remove(hash_map_t *map, uint8_t *key, int64_t length) {
R01:    map_result_t result = {.status = NOT_FOUND, .state = 0, .value = 0};
R02:    hash_index_t *index;
R03:    int64_t blk_idx;
R04:    cblock_t *block;
R05:    int i;
R06:    int64_t mask;
R07:    block_cntrl_t before;
R08:    block_cntrl_t after;
R09:
R10:    AFA(&map->accessors, 1);
R11:    index = map->start;
R12:    do {
R13:        blk_idx = compute_block_index(index, key, length);
R14:        block = &index->blocks[blk_idx];
R15:        before = block->cntrl;
R16:        mask = 1;
R17:        for (i = 0; i < BLOCK_COUNT; i++) {
R18:            if (mask & block->cntrl.bit_map) {
R19:                pair_ref_t *ref = block->items[i];
R20:                if (ref) {
R21:                    result = compare_keys(ref, key, length);
R22:                    if (SUCCESSFUL(result.status)) {
R23:                        after.version = before.version + 1;
R24:                        after.bit_map = (before.bit_map & ~mask);
R25:                        if (!CAS((uint64_t*)&block->cntrl, before.bits, after.bits)) {
R26:                            before = block->cntrl;
R27:                            result.value = NULL;
R28:                            result.state = 0;
R29:                            result.status = NOT_FOUND;
R30:                            i = -1;
R31:                            mask = 1;
R32:                            continue;
R33:                        }
R34:                        block->items[i] = NULL;
R35:                        free_key_value(map, ref);
R36:                        AFS(&index->size, 1);
R37:                        break;
R38:                    }
R39:                }
R40:            }
R41:            mask <<= 1;
R42:        }
R43:        index = index->next;
R44:    } while (!SUCCESSFUL(result.status) && index != NULL);
R45:
R46:    check_resize(map);
R47:
R48:    AFS(&map->accessors, 1);
R49:    check_index_list(map);
R50:    return result;
R51: }
```

FIG. 30

```
map_result_t hash_add(hash_map_t *map, uint8_t *key, int64_t length, void *value) {
A01:    map_result_t result = {0};
A02:    hash_index_t *index, *successor, *current;
A03:    cblock_t *block;
A04:    block_cntrl_t before, after;
A05:    int i, empty;
A06:    int64_t blk_idx , mask, position;
A07:    pair_ref_t *ref;
A08:    AFA(&map->accessors, 1);
A09:    while (true) {
A10:        index = map->start; result.status = NOT_FOUND;
A11:        // look for existing match
A12:        do {
A13:            blk_idx = compute_block_index(index, key, length);
A14:            block = &index->blocks[blk_idx];
A15:            before = block->cntrl;
A16:            current = index; empty = -1; mask = 1; position = 0;
A17:            for (i = 0; i < BLOCK_COUNT; i++) {
A18:                if (mask & block->cntrl.bit_map) {
A19:                    ref = block->items[i];
A20:                    if (ref) {
A21:                        result = compare_keys(ref, key, length);
A22:                        if (result.status == SUCCESS) {
A23:                            result.status = UPDATE_CONFLICT;
A24:                            result.state = ref->version;
A25:                            result.value = ref->value;
A26:                            break;
A27:                        }
A28:                    }
A29:                } else if (empty < 0 && block->items[i] == index->null) {
A30:                    empty = i;
A31:                    position = mask;
A32:                }
A33:
```

FIG. 31a

```
A34:            mask <<= 1;
A35:        }
A36:        index = index->next;
A37:    } while (result.status == NOT_FOUND && index != NULL);
A38:    if (result.status == UPDATE_CONFLICT)
A39:        break;
A40:    // pre-existing item not found, attempt to update empty slot
A41:    if (empty >= 0) {
A42:        pair_ref_t *ref = allocate_ref(map, key, length, value, -1);
A43:        if (ref == NULL) {
A44:            result.status = ERR_NOMEM;
A45:            break;
A46:        }
A47:        if (!CAS((uint64_t*)&block->items[empty], (uint64_t)current->null, (uint64_t)ref)) {
A48:            free_key_value(map, ref);
A49:            continue;
A50:        }
A51:        after.version = before.version + 1;
A52:        after.bit_map = (before.bit_map | position);
A53:        if (current->null || !CAS((uint64_t*)&block->cntrl, before.bits, after.bits)) {
A54:            block->items[empty] = NULL;
A55:            free_key_value(map, ref);
A56:            continue;
A57:        }
A58:        AFA(&current->size, 1);
A59:        result.status = SUCCESS;
A60:        result.state = ref->version;
A61:        break;
A62:    }
A63:    // no empty slot, overflow to expanded hash index
A64:    CAS((uint64_t*)&current->null, (uint64_t)NULL, (uint64_t)NULL_BLOCK);
A65:    successor = calloc(1, sizeof(hash_index_t) + ((current->capacity << 1) - 1) * sizeof(cblock_t));
A66:    if (successor == NULL) {
A67:        result.status = ERR_NOMEM;
A68:        break;
A69:    }
A70:    successor->capacity = current->capacity << 1;
A71:    next = current->next;
A72:    if (next == NULL) {
A73:        if (CAS((uint64_t*)&current->next, (uint64_t)next, (uint64_t)successor))
A74:            CAS((uint64_t*)&map->end, (uint64_t)current, (uint64_t)successor);
A75:        else
A76:            free(successor);
A77:    } else {
A78:        CAS((uint64_t*)&map->end, (uint64_t)current, (uint64_t)next);
A79:        free(successor);
A80:    }
A81: }
A82: check_resize(map);
A83: AFS(&map->accessors, 1);
A84: check_index_list(map);
A85: return result;
A86:}
```

FIG. 31b

```
map_result_t hash_update(hash_map_t *map, uint8_t *key, int64_t length, void *value, int64_t state) {
U01:     map_result_t result = {0};
U02:     hash_index_t *index;
U03:     hash_index_t *next;
U04:     hash_index_t *head;
U05:     cblock_t *block;
U06:     int64_t blk_idx;
U07:     int i;
U08:     int64_t mask;
U09:     pair_ref_t *ref;
U10:
U11:     APA(&map->accessors, 1);
U12:     while (true) {
U13:         index = map->start;
U14:         result.status = NOT_FOUND;
U15:
U16:         // look for existing match
U17:         do {
U18:             blk_idx = compute_block_index(index, key, length);
U19:             block = &index->blocks[blk_idx];
U20:
U21:             mask = 1;
U22:             for (i = 0; i < BLOCK_COUNT; i++) {
U23:                 if (mask & block->cntrl.bit_map)
U24:                 {
U25:                     ref = block->items[i];
U26:                     if (ref) {
U27:                         result = update_existing(map, ref, key, length, value, state);
U28:                         if (result.status != NOT_FOUND) {
U29:                             break;
U30:                         }
U31:                     }
U32:                 }
U33:
U34:                 mask <<= 1;
U35:             }
U36:             index = index->next;
U37:         } while (result.status == NOT_FOUND && index != NULL);
U38:
U39:         if (result.status != RETRY)
U40:             break;
U41:     }
U42:     check_resize(map);
U43:
U44:     APS(&map->accessors, 1);
U45:     check_index_list(map);
U46:     return result;
U47: }
```

FIG. 32

```
map_result_t hash_delete(hash_map_t *map, uint8_t *key, int64_t length, int64_t state) {
D01:    map_result_t result = {.status = NOT_FOUND, .state = 0, .value = 0};
D02:    hash_index_t *index;
D03:    hash_index_t *next;
D04:    hash_index_t *head;
D05:    int64_t blk_idx;
D06:    cblock_t *block;
D07:    int i;
D08:    int64_t mask;
D09:    block_cntrl_t before;
D10:    block_cntrl_t after;
D11:
D12:    AFA(&map->accessors, 1);
D13:    index = map->start;
D14:    do {
D15:        blk_idx = compute_block_index(index, key, length);
D16:        block = &index->blocks[blk_idx];
D17:        before = block->cntrl;
D18:        mask = 1;
D19:        for (i = 0; i < BLOCK_COUNT; i++) {
D20:            if (mask & block->cntrl.bit_map) {
D21:                pair_ref_t *ref = block->items[i];
D22:                if (ref) {
D23:                    result = compare_keys(ref, key, length);
D24:                    if (SUCCESSFUL(result.status)) {
D25:                        if (state == ref->version) {
D26:                            after.version = before.version + 1;
D27:                            after.bit_map = (before.bit_map & ~mask);
D28:                            if (!CAS((uint64_t*)&block->cntrl, before.bits, after.bits)) {
D29:                                before = block->cntrl;
D30:                                result.value = NULL;
D31:                                result.state = 0;
D32:                                result.status = NOT_FOUND;
D33:                                i = -1;
D34:                                mask = 1;
D35:                                continue;
D36:                            }
D37:                            block->items[i] = NULL;
D38:                            free_key_value(map, ref);
D39:                            AFS(&index->size, 1);
D40:                            break;
D41:                        } else {
D42:                            result.status = UPDATE_CONFLICT;
D43:                            break;
D44:                        }
D45:                    }
D46:                }
D47:            }
D48:            mask <<= 1;
D49:        }
D50:        index = index->next;
D51:    } while (result.status == NOT_FOUND && index != NULL);
D52:    check_resize(map);
D53:    AFS(&map->accessors, 1);
D54:    check_index_list(map);
D55:    return result;
D56: }
```

FIG. 33

SYSTEM AND METHOD FOR IMPLEMENTING NON-BLOCKING, CONCURRENT HASH TABLES

PRIORITY CLAIM

This application is a continuation application claiming priority under 35 U.S.C. § 120 to co-pending U.S. patent application Ser. No. 15/374,991, filed on Dec. 9, 2016, which claims priority under 35 U.S.C. § 119(e) to U.S. Provisional Patent Application Ser. No. 62/265,006, filed on Dec. 9, 2015. The entire content of each of these applications is hereby incorporated herein by reference.

BACKGROUND

Concurrent computing environments use ever more powerful and complex multicore and/or multi-CPU platforms, with highly multithreaded operations. Especially where multiple and simultaneous producers (e.g., writers) and consumers (e.g., readers) operate on a given memory structure, this heightens the risk of process and/or thread contention, latency, and inefficient memory usage. As a result, concurrent computing can be associated with significant performance constraints. Such constraints can slow current processes and impose an opportunity cost of foregone added ones.

Hash tables have been used in high performance systems as a means of mapping a key to a specific value with constant amortized cost in terms of timing per read and write operation. Hash tables may be used to implement both sets and associative map data structures. With the rise of multi-core processors, there is an increasing emphasis on lock-free algorithms in order to reduce the contention introduced by managing concurrency using locks. Most of the current approaches to implementing lock-free hash tables use a closed addressing approach based on the use of lock-free linked lists.

Mechanisms have been designed to address these constraints. These include locking mechanisms that can selectively brake producers so that consumers can "catch up." Disadvantages of locking mechanisms are known and can include significant wait times, thread stalls or thread death, and limited scalability. A lock-free mechanism, however, presents challenges as well, including the A-B-A problem, where state can appear identical from a first read to a second read, but in fact a separate process has "secretly" modified shared memory before changing it back again.

SUMMARY

Disclosed herein are systems and methods for implementing lock-free hash tables using an array-based, open addressing approach. At least some of the design issues the array-based, open addressing implementations overcome are those regarding the inability to dynamically resize and the prevention of duplicates. Specifically, the present disclosure outlines systems and methods of efficiently operating a memory in a computing system, in particular through the use of a hash table with hash sets or hash maps.

Hash tables can be used to either implement a hash set or an associative hash map. With hash sets, a goal is to test the set for membership of the key. In one embodiment, the key is simply an integer value or pointer address that can be contained within an array bucket slot itself. In another embodiment, the key could be an arbitrarily long string of bytes, for example, and the content of an array bucket is a pointer to the memory containing the key. In another embodiment, the key and value are identical, and the implementation encompasses the case where the key is no longer than the natural size of a system pointer or equivalently sized integer that fits in an index slot. Since the key fits in an index slot, the hash set will have no issue with being updated or read by multiple processes or threads, which may be an issue for associative maps.

Techniques for managing hash buckets in a hash table are also disclosed herein, which work in a non-blocking fashion and control updates in such a way as to guarantee that the updates can be moved in a non-blocking fashion with simultaneous adds and deletes occurring while also insuring that a look up will find a particular update.

The present disclosure provides systems and methods to update the hash set or hash map in a coordinated, thread-safe manner. In one embodiment, the system and method allows for a standard "put" and/or "remove" as in other embodiments, but it may lead to a model of "last write wins" by competing threads which is useful in some circumstances, though limited in other multhreaded/multiprocess coordination scenarios. In one embodiment, the add/update/delete functions provide a mechanism for thread safe updates based on the versioning of the key/value pairs. The "add" function may be a unique add that insures that no other thread has added a key/value pair with a specified key, otherwise, that other thread may fail. In addition, the update/delete functions allow specifying a previous version of the key/value pair that is expected to be present in the associative map, while the functions may fail otherwise. These features allow the hash map to be updated in a thread-safe fashion such that a thread can add/update/delete successfully only if the key/value pair state has not been altered by another thread.

In another embodiment, a hash map implementation is disclosed that is different than a hash set implementation while the hash map builds on the hash set design. As with a hash set, a hash map has several possible variations. Instead of the key and value being identical, the key has a separate reference to a memory item used for a value and another reference to a specified key of arbitrary length, which has to be copied for thread safety purposes. According to embodiments, there are additional memory management and thread safety issues to address with a hash map implementation. In addition, a hash map interface may be more complex than a hash set implementation because it allows both for a simpler, single source update interface and also allows for a more complex set of algorithms that allow for updates from multiple sources. In one embodiment, a hash map design is able to enforce an atomic, unique add as well as being able to detect and prevent simultaneous updates and deletes. As mentioned herein, an operation (or set of operations) is atomic if it appears to the rest of the system to occur instantaneously. The atomic nature of the operation provides a guarantee of isolation from concurrent processes.

In one embodiment, a hash function associated with a hash set or hash map deals with an integral value and simply proceeds through a number of shifts based on the size of the hash index it is targeting in order to evenly distribute the keys in the hash index. The initial implementation for the hash map, the hash function converts the key to an integer by a series of multiplications by the value of 33 and additions of key bytes called 'times 33'. The design is not dependent on any particular hash function.

The embodiments disclosed herein for both the non-blocking hash set and non-blocking hash map have proven to be effective and practical implementations that address the cited design problems and objections. In addition, these designs, in particular the hash map, provide capabilities not found in other approaches by providing the ability to handle modifications by multiple sources with its ability to detect collisions. The hash set has proved useful in implementing a multi-threaded memory pool for tracking large blocks of allocated memory that are not managed directly by the pool, and also providing efficient mechanisms for debugging memory allocation issues without affecting application performance.

BRIEF DESCRIPTION OF DRAWINGS

FIG. 2 is an embodiment of code that defines the basic data structures used in an embodiment of a non-blocking hash set.

FIG. 6 is an embodiment of code that creates and initializes the data structures shown in FIGS. 3 and 4.

FIG. 7 is an embodiment of code that performs operations that update a hash set.

FIG. 8 is an embodiment of code that performs an internal add operation according to an embodiment.

FIG. 9 is code that performs operations to convert a value and return a specific block in a hash index according to an embodiment.

FIG. 10 is an embodiment of code that performs operations to transfer a block of values from one hash index to another hash index according to an embodiment.

FIG. 11 is an embodiment of code that performs a query on a hash set according to an embodiment.

FIG. 12 is an embodiment of code that removes a value from a hash set according to an embodiment.

FIG. 13 is an embodiment of code that defines the structures of a hash map.

FIG. 15 is an embodiment of code that performs operations related to initialization, allocating, and deallocating of a hash map.

FIG. 16 is an embodiment of code that takes a key and returns a block of a hash map.

FIG. 17 is an embodiment of code that defines a structure regarding operations performed on a hash map.

FIG. 18 is an embodiment of code that performs an operation of placing a key value pair in a hash map.

FIG. 19 is an embodiment of code that performs an operation to update an existing key value pair in a hash map.

FIG. 20 is an embodiment of code that performs an operation to allocate a key value pair in a hash map.

FIG. 21 is an embodiment of code that performs an operation to deallocate key value pairs whose release have been differed in a hash map.

FIG. 22 is an embodiment of code that performs add and remove operations and deallocation of associated memory in a hash map.

FIG. 23 is an embodiment of code that performs an operation to check if a hash map is being resized and if so, transfer a block from one hash index to another.

FIG. 24 is an embodiment of code that performs an operation to transfer a block from one hash index to another.

FIG. 25 is an embodiment of code that performs an operation that rehashes from one hash index to another.

FIG. 26 is an embodiment of code that performs an operation that expands hash indexes of a hash map.

FIG. 27 is an embodiment of code that performs an operation that advances pointers in a hash map.

FIG. 28 is an embodiment of code that performs a query on a hash map for a specified key that returns a value.

FIG. 29 is an embodiment of code that performs an operation that compares a query key to a key in a key value pair.

FIG. 30 is an embodiment of code that performs an operation that removes a value associated with a key in a hash map.

FIGS. 31a-b are an embodiment of code that performs a unique add that succeeds only if a key in a hash map does not exist.

FIG. 32 is an embodiment of code that performs an operation that updates a key value pair in a hash map only if a preexisting state is still valid.

FIG. 33 is an embodiment of code that performs an operation that deletes a value that matches a key in a key value pair of a hash map only if a preexisting state is still valid.

DETAILED DESCRIPTION

In the following description, reference is made to the accompanying drawings which illustrate several embodiments of the present invention. It is understood that other embodiments may be utilized, and mechanical, compositional, structural, electrical and other operational changes may be made without departing from the spirit and scope of the present disclosure. The following detailed description is not to be taken in a limiting sense, and the scope of the embodiments of the present invention is defined only by the claims of the issued patent.

Figure 1:
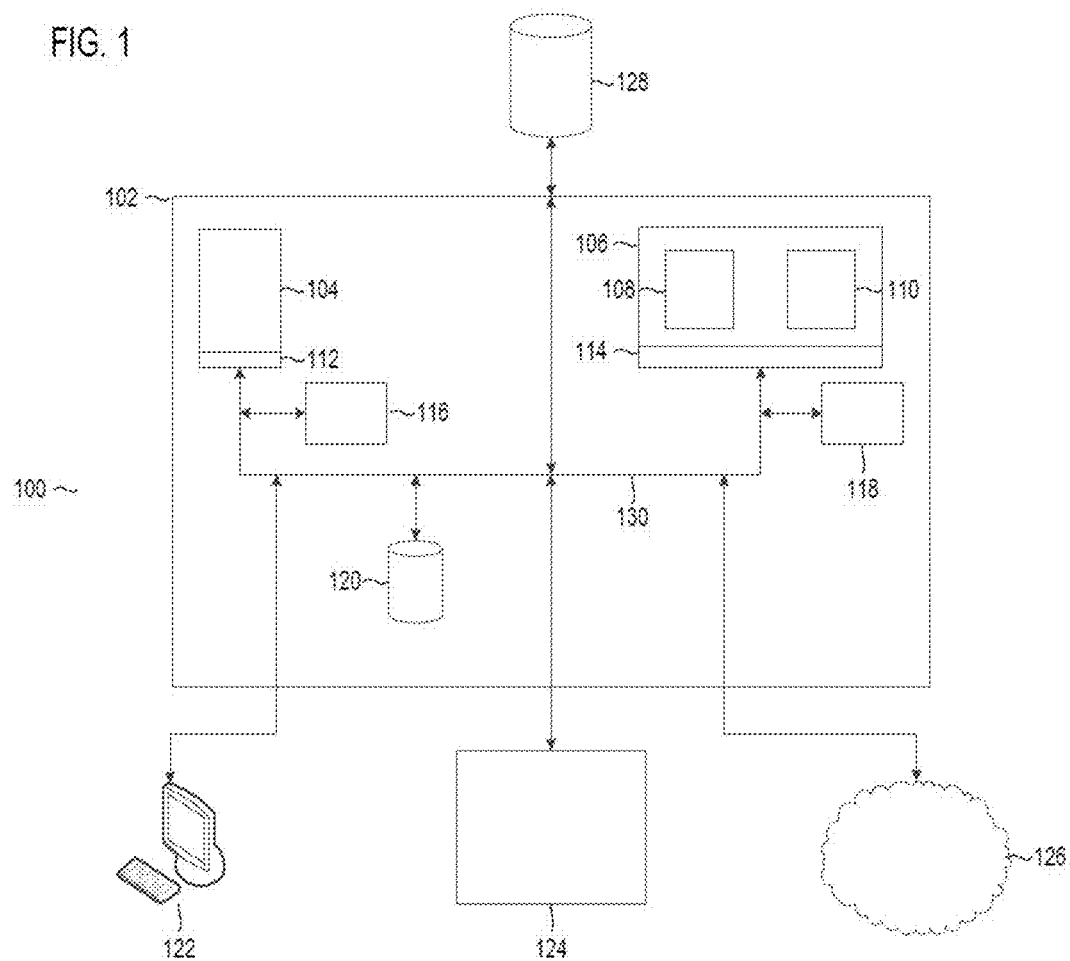
FIG. 1 illustrates an example computing environment according to an embodiment.

FIG. 1 depicts an example architecture in accord with embodiments. System 100 comprises computing functionality, both local and distributed. System 100 may have a unit 102 comprising one, two or more central processing units 104,106, which can be considered processors. Unit 102 can be a server or servers. A processor can be single-core 104, or have multiple cores 108, 110 where more than one processor can be placed on a "chip". The processor 104, 106 can execute instructions by many techniques, in concurrent processes and threads. Many variations of multiprocessor and/or multicore systems can be used. There may be multiple memory components. Certain memory components can be considered main memory 120, which may be shared among one or more processors 104, 106. Other memory components can be considered cache memory 112, 114, 116, 118, which may be more closely associated with a specific processor 104, 106. Caches can be divided into levels, e.g., L1 cache 112, 114, L2 cache 116, 118, and more. A bus 130 or other interconnection functionality can permit communication within and beyond a system. An additional unit 124 with comparable functionality can be in operative communication with a first unit 102. There can be display and input/output functionality 122. Also, a network or networks 126 can be present. Additionally, outside memory 128 or memories can be utilized. It will be readily appreciated that many interoperative variations, configurations, and architectures can be employed in accord with embodiments disclosed herein.

Figure 3:
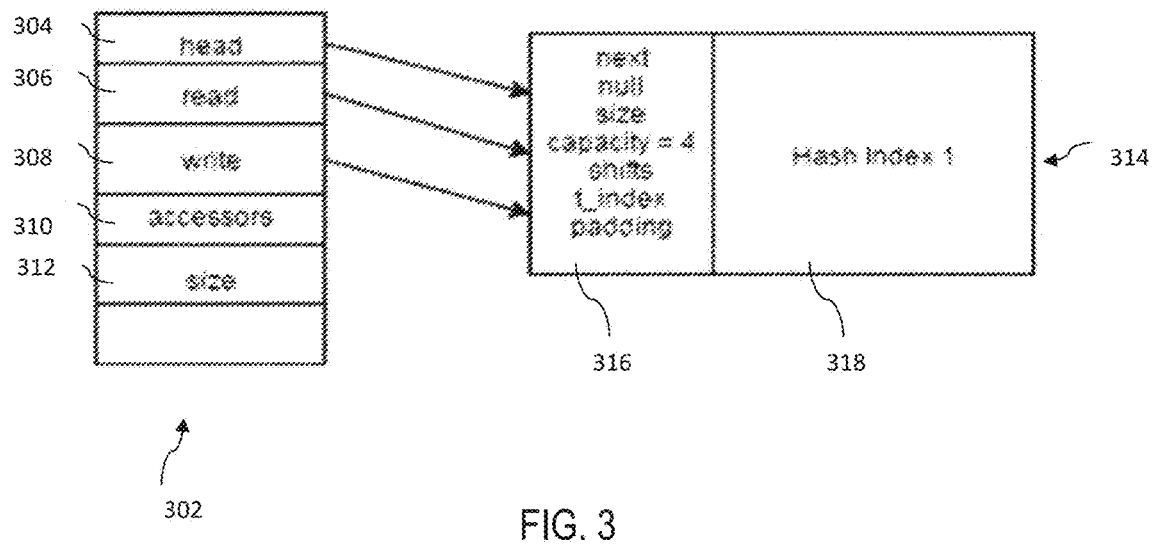
FIGS. 3-4 illustrate an embodiment of the present disclosure whereby the size of a hash index is adjusted using a hash set.
Figure 4:
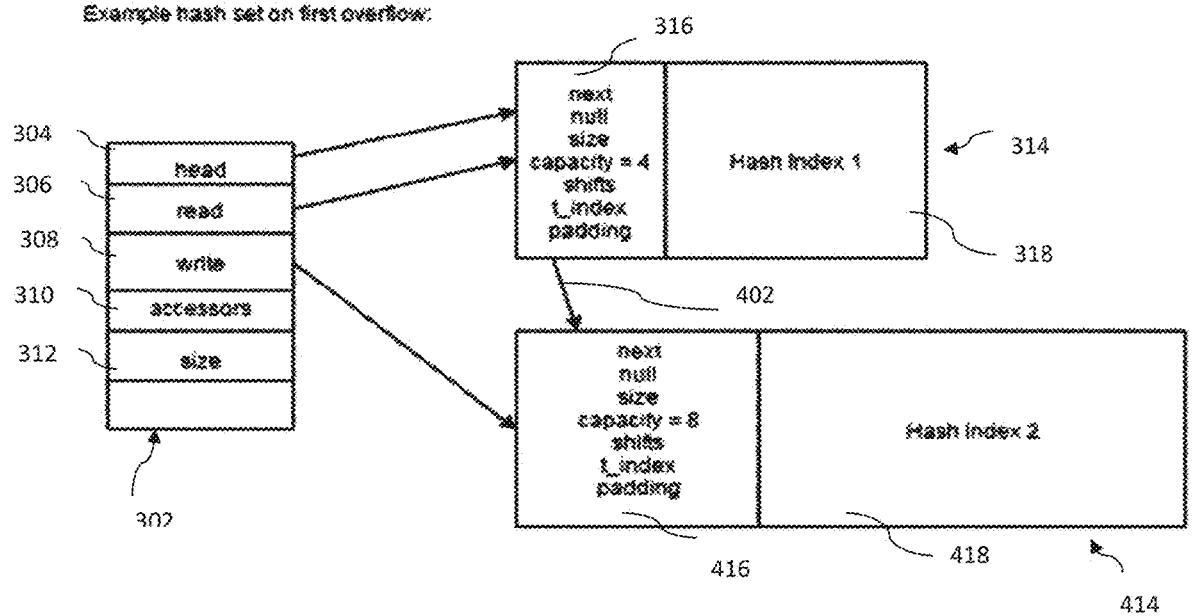

FIG. 2 is code that defines the basic data structures shown in FIGS. 3-4, used in a non-blocking hash set. The main structure is the hash_index, which consists of a header portion followed by an array of cache line aligned blocks. The size of the array of cache line aligned blocks can be tuned based on performance. The cache line aligned blocks may be allocated in counts that are a power of two and are cache line aligned. Being a power of two makes computing the index of the relevant block from the computed hash an efficient masking operation. The header portion contains a pointer to the next hash_index structure if it exists. The next hash_index structure may contain twice the number of blocks. There is a null value slot that is used for comparing to null slots that is set to the NULL_BLOCK value when items are no longer allowed in the current hash_index during a resizing operation. The size is the number of items currently stored in the hash_index. The capacity is the number of blocks in the hash_index and the shifts value is the precomputed number of shifts to be used for calculating the block index. The t_index value is used for indicating the next block that needs to be transferred to a larger hash_index during resizing. Finally the pad bytes keep things aligned on cache line boundaries for memory access efficiencies. The associated array of indexing blocks are appended to the header.

The mem_set structure consists of three pointers which are used to maintain a list of hash_index structures. The head pointer always references the start of the list, and the write pointer is the end of the list and the current hash_index where new items are currently being added. The read pointer references refers to the first hash_index with active items that have not yet been transferred to the current writing hash_index. The accessors value is a reference counter of the active number of readers and writers that might actively be referencing the hash indexes, which is needed to know when to safely released older, unused indexes. Finally, the size is the total number of items contained in all the referenced hash indexes.

FIGS. 3-4 depict a sequence of state changes illustrating a relationship between a hash set and associated hash index, and more specifically how added hash indexes can be declared and utilized upon detection of a potential overflow condition and how pointers in a queue can adjust accordingly. FIG. 3 depicts an example hash set state upon initialization. By way of non-limiting example, capacity in hash index 1 is set to 4. FIG. 4 depicts an example state upon detection of a first overflow and shows the hash set structure during a resize operation when the hash_index overflows. It is noted that in FIG. 4, capacity of hash index 1 is 4, and hash index 2 is 8, in accord with embodiments where the newly allocated hash index has double the capacity. The overall data structures can be seen in FIGS. 3-4, and aspects are similar to a resizable ring buffer queue design described in International Patent Publication No. WO2014201408 and U.S. Patent Application Publication No. US2016/070535, each entitled "QUEUEING DATA FOR MULTIPLE READERS AND WRITERS", the entireties of which are incorporated by reference herein.

As shown in FIGS. 3 and 4, a hash set structure 302 is utilized. Hash set structure 302 can have a reader portion and writer portion aligned to be in separate cache lines. The hash set structure 302 consists of three pointers which are used to maintain a list of hash index structures. Head pointer 304 points to the first hash index 314 in the linked list of hash indexes 314, 414 and read pointer 306 can point to the hash index currently being drained of items. The head pointer 304 always references the start of a list, and the write pointer 308 is the end of the list. The accessors value 310 is simply a reference counter of the active number of readers and writers that might actively be referencing the hash indexes, which is needed to know when to safely released older, unused indexes. Finally, the size 312 is the total number of items contained in all the referenced hash indexes.

Furthermore, the main data structure is the hash index 314, 414 which consists of a header portion followed by an array of cache line aligned blocks. The size of the array of cache line aligned blocks can be tuned based on performance. The cache line aligned blocks may be allocated in counts that are a power of two and are cache line aligned. Being a power of two makes computing the index of the relevant block from the computed hash an efficient masking operation. The header portion contains a pointer to the next hash index structure, if it exists, such as hash index 2 shown in FIG. 4. As illustrated in FIG. 4, the hash index 2 structure 414 contains twice the number of blocks as the hash index 1 structure 314. There is a "null" value slot that is used for comparing to null slots that is set to the NULL_BLOCK value when items are no longer allowed in the current hash index during a resizing operation. The "size" is the number of items currently stored in the hash index. The "capacity" is the number of blocks in the hash_index and the "shifts" value is the precomputed number of shifts to be used for calculating the block index. The "t_index" value is used for indicating the next block that needs to be transferred to a larger hash index during resizing. In addition, "padding" can be used to reduce the possibility of conflict due to cache line sharing. A next field pointer 402 is depicted. Additionally, pad bytes may be used to keep things aligned on cache line boundaries for memory access efficiencies. The associated array of indexing blocks may be appended to the header.

Figure 5:
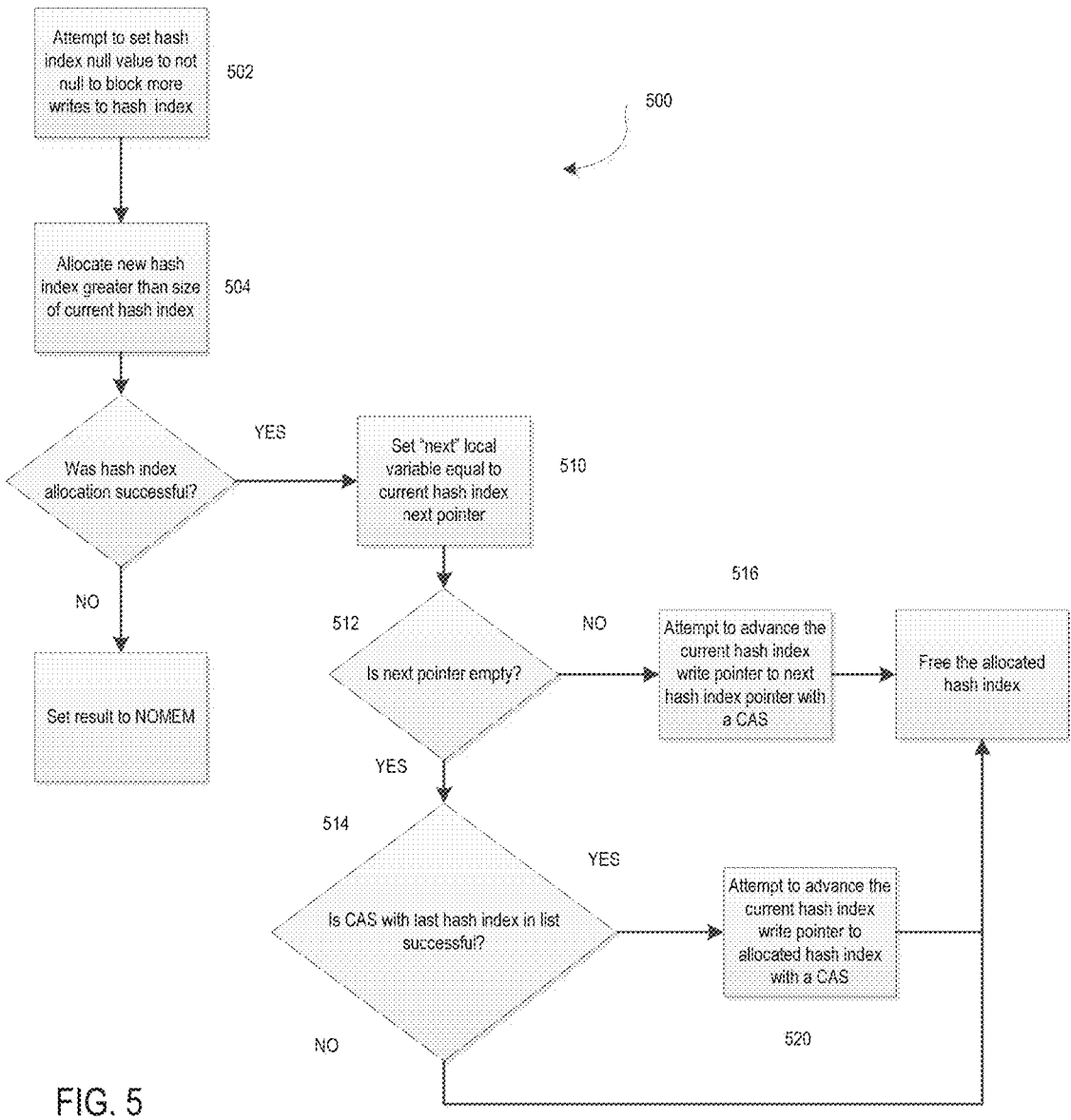
FIG. 5 is a flowchart of an embodiment of a method for resizing a hash index.

FIG. 5 is a flowchart illustrating a method 500 to add to or increase the size of a current hash index. The method demonstrates how the system can dynamically adjust utilizing a logical perspective if the hash index—which has a finite number of buckets from a physical perspective—becomes full. It is clear that if buckets of the hash index become progressively filled then, given the nature of the data structure, physical overflow is possible unless measures are taken. Accordingly, a determination can be performed to establish whether an overflow condition has been encountered, i.e., the hash index is full. In other words, a check is made whether it is acceptable to keep writing to the current hash index.

As shown, an attempt is made at 502 to set a current hash index null value to not null to block more write to the current hash index. The system then allocates at 504 a new hash index that is greater in size than the current hash index. The system allocates a second larger hash index once the first ring buffer is determined to be full, and additional data can be written directly to the new hash index, while at the same time existing data can be drained from the first hash index as it is required. In one embodiment, the size of the new hash index is twice the current hash index.

A determination is made at 506 as to whether the hash index allocation was successful. If it wasn't successful, this means that there is not sufficient memory available and the system returns 508 a result that indicates there is not sufficient memory. For example, the result can be set to NOMEM indicating out of memory. If the hash index allocation was successful, then a "next" local variable is set 510 to equal a current hash index next pointer. Accordingly, at least a second, expanded hash index has been allocated. Additional hash indexes may be allocated by additional threads as well. A determination is then made at 512 as to whether the next pointer is empty. If the next pointer is not empty, then at 516 an attempt is made to advance the current hash index write pointer to the next hash index pointer with a CAS operation. Another allocated hash index can then be freed or deallocated at 518. If the next pointer was determined to be empty, then a determination is made at 514 if a CAS with the last hash index in a linked list of hash indexes (which may be the second of two hash indexes) was successful. If it was unsuccessful, then an attempt is made at 520 to advance the current hash index write pointer to the allocated hash index with a CAS and another allocated ring buffer is freed or deallocated at 518. Once the allocated hash index has been synchronized properly with a hash set, the computing system may carry on almost immediately following the allocation of a new hash index. Accordingly, the allocated hash index may have data written to the slots of the buckets of the allocated hash index following alignment of the pointers described above. The functionality described above can be extended upon further iterations through the procedure such that multiple hash indexes can be dynamically allocated as needed, each larger in size than the prior one (any size that is larger than the prior one will suffice).

The hash_set_create function in FIG. 6 creates and initializes the set of structures in FIGS. 3-4. The hash_set_release function releases any partially instantiated hash set. The key to making the hash set work in a non-blocking fashion is in the cache_line_block struct which consists of an update counter, a bit map of occupied slots in the block, and a number of slots defined by BLOCK_COUNT constant. According to embodiments, the BLOCK_COUNT can be arbitrarily defined. In one embodiment, the BLOCK_COUNT constant is defined to be long enough, along with the update counter and bit map, to occupy two cache lines. Each hash index has an array of blocks, and every operation computes a block index based on hashing the key which will resolve to a specific block in the array based on a masking operation. The bit map indicates which slots are actively occupied and can be compared against. The update counter is atomically incremented every time the bit map value is modified so that operations updating can detect when the bucket contents has changed and can retry the operation. This can best be seen by examining the operations that update the hash set starting with the add function in FIG. 7.

In FIG. 7, lines A10 to A27 are the lines where the atomic add takes place starting and ending with the Atomic Fetch and Add (AFA) which increments the accessor count and the Atomic Fetch and Subtract (AFS) which decrements the accessor count. Lines A29 through A45 check first that the accessor count for the set is zero which means it is safe to update the hash_index list, and then lines check to see if the read pointer needs to be advanced to next hash_index in the list. The Compare and Swap (CAS) instruction on line A33 does the atomic update to the next hash_index in the list. Lastly, lines A36 through A44 determine if the head pointer needs to be advanced and the first hash_index is freed if the CAS at line A41 succeeds insuring only a single process performs the release of the memory.

Between incrementing and decrementing the accessor count, two operations are performed. On lines A11 through A17, the function internal_add is called, and the returned value checked A15. If there is a conflicting update detected, it is converted to a successful operation since it is not an error to add an item to set that is already contained in the set. Lines A19 through A26 a check is made for an expanded hash index indicating a resize is needed and attempts to transfer a block from the current read hash_index to the current write hash_index for the set.

On line A11, the function internal_add is called to add the item to the set, and the logic for that function is listed in FIG. 8. Line I07 of FIG. 8 shows an endless loop that aids in retrying steps when an attempt to add the item fails, which is a pattern repeated in all functions that update the hash set. The three places that the loop can be exited are on line I22 with an update conflict since item is already in set, a successful add on line I48, and an out of memory condition on line I67 when attempting to expand the hash set. Lines I10 through I30 are a do/while loop that will loop through the list of hash indexes till it hits the end of the list. Line I11 computes the block index based on shifting the key value and masking off the higher order bits performing a power of 2 modulo operation as seen in FIG. 9. The saving of the update counter and bit map at lines I13 and I14 prevent any modifications that might add a duplicate before the actual update in lines I31 through I48.

Lines I19 through I28 loop through the slots in the block, first testing the bit map value in line I20 before comparing at line I21. This order is critical for being able to add and remove items from the block in a lock-free fashion while still being able to detect changes to the block that will require retrying an operation. If the values match, an update conflict indicator is immediately returned. Lines I23 through I26 check to see if an empty slot is not found and if the slot is empty, recording the slot and bit position in the bit map. Line I27 shifts the bit mask one position before advancing to look at the next slot. If the for loop completes then the current hash index does not contain the value, and if the do/while loop on line I30 terminates then no hash index in the hash set contains the value.

Lines I33 through I49 attempt to add items not found in the hash set by the test on line I31. On line I32, the CAS attempts to add the value to the empty slot, and will retry by continuing at the top of the loop on line I33. Lines I34 through I40 set up and execute a Double Word Compare and Swap (DWCAS) instruction updating the first two slots of the block which contain an update counter and the bit map of occupied, active slots. The update counter is incremented and the bit map is updated by or operation with the current position mask. Lastly, the previous bit map is updated by or operation with current null value, which would be changed if a new hash index was added, thus blocking any new add to current hash index if the null value for the hash_index has been changed. If the DWCAS fails, the value is cleared from the previously occupied slot because another value has been added to the block and the process continues at the top of the retry loop. Thus, no value can be added without comparing against every value currently in the block. Lines I41 through I48 are executed if bit map updated successfully making item active. The current block, the slot within the block, and position mask are set before returning success indicator.

Lines I50 through I67 attempt to add an expanded hash index to the hash set when no empty slot is found to add an item to the current hash index. Line I51 alters the null value with the blocking value preventing any more adds to the current hash index. Then a new hash index is allocated with a block array that is twice the size of the current one on line I52. Lines I57 through I65 attempt to append the hash index to the end of the hash index list, and if it doesn't succeed attempts to aid the add operation initiated in another process on line I63 and frees the no longer needed hash_index allocation on line I64.

The internal_add function is also called by the transferBlock function in FIG. 10, which was invoked on line A24 of the hash_set_add in FIG. 7 when the hash set is being resized with an expanded hash_index structure. The current block to be moved is determined on line T18 by incrementing the stored value in the hash_index and performing a power of 2 modulo operation by masking off higher order bits based on the number of blocks in the array. This step may be taken to minimize contention by having the next thread work the adjacent block till the entire contents of the hash_index has been moved to the larger hash_index instance.

Lines T23 through T58 loop through the entire block, testing the bit map for active item at line T28, and the existence of the item at line T32, before attempting to add to larger hash_index by calling internal_add on line T37. On line T44, the DWCAS is an attempt to update the bit map and update counter with the bit map value that was cleared on line T43. If the update fails, it is because another thread has updated that block so the do/while loop updates the bit map using the new block location returned from the internal add call will retry until it succeeds and the value cleared on line T52. The thread returns at that point because it detected contention by being unable to update the bit map. If the update of the bit map on line T44 succeeds, line T55 clears the value and the loop advances to the next position until the entire block is cleared.

FIG. 11 presents the membership test function hash_set_has_value, which is simpler than the functions with modify the hash set. After accessing the current read hash_index, it simply hashes the value to the correct block, and then scans the block looking for the value. The do/while loop from line H15 to line H29 insures that if there is more than one hash_index in the list, that all are scanned if it is not found in a preceding hash_index. Lines H20 and H21 test the bit map before comparing the value, and if the value matches then result is set to true and exits the loop at line H23. If all hash indexes are scanned without finding a matching value the result defaults to false. Lines H31 through H38 check to see if a resize is occurring and transfer a block, as described for hash_add. The same applies to lines H41 through H58 where the identical check for advancing the hash_index list pointers is performed, as in all the hash set access functions.

The hash_set_remove function in FIG. 12 is structured much the same way as the search for membership, but instead of simply returning true if found the value is removed instead. So lines R12 through R41 loop through the hash_index list starting from the current read position. For each hash_index structure, the correct block is calculated at R14, and then the block is scanned in lines R19 through R39. Each bit in the bit map is tested on line R20 and the value compared for a match at line R21.

The update counter and bit map are modified in lines R22-23 and the DWCAS attempts to record the change on line R24. If the atomic update fails because another process modified the block, the new update counter and bit map are saved on lines R25 and R26 and the mask and index value are restored to values that will restart the scan at the beginning of the block and the loop continued. If the DWCAS succeeds, it is safe to clear the value by simply assigning a null value on line R31 and return a success indicator. The remaining lines implement the incremental resizing and updating of the hash_index list as previously described.

Regarding an embodiment of the present disclosure involving a hash map, the structures used in the hash map are defined in FIG. 13. The root structure is the hash_map, which has a number of additional fields defined relative to the hash set structure previously described. In addition to the accessors field, which acts as a reference count of accessing processes, there is the list of hash_index structures maintained by head and end pointers with the start pointer pointing to the first active index in the list. The hash_index is very similar to the one used for the hash set, with one exception. Instead of using one 64 bit pointer slot for update counter and another for the bit map, the hash map implementation combines them into a single 64 bit pointer slot using the block—cntrl union in order to save space and increase the number of available slots so the BLOCK—COUNT value used is 15. Other than that difference, the hash—index is essentially identical to the hash—index used in the hash set.

Because the hash map tracks key/value pairs, which cannot be stored in a hash—index slot like the hash set, the hash—index in this case always stores a pointer to a pair—ref struct, which takes 64 bytes to match a cache line on a 64-bit CPU to minimize cache sharing when updating a key/value pair. The kv—buffer pointer points to the last allocated pair—ref buffer used to allocate pair—ref structs as the first item in a linked list of buffers that acts essentially as a pushdown stack to track the buffers. The defer pair list maintains a linked list of pair—ref structs that have been removed from the map, but still have active processes still referencing them. The avail pair list is the list of available pair—ref structs that have no active references and can thus be reused.

The first field in a pair—ref is a next field since pair—refs that are removed from the map are added to a linked list. The count field is used as a tag field to prevent occurrences of the ABA update problem, where a state can appear identical from a first read to a second read, but in fact a separate process has "secretly" modified shared memory before changing it back again. The value pointer points to the memory location that represents the value to be associated with the key. The version field tracks the current version of the item which will be shown to allow updates to occur from multiple sources. The key pointer points to the allocated copy of the key field associated with the value, and the refs field acts as a reference counter of processes accessing the key for comparison. The length field is the length of the allocated memory for the key, and the padding field is simply to round out the size of the struct to 64 bytes to fill a cache line.

The pair—list structure used for both the avail list and the defer list consists of a head pointer and a tail pointer along with their respective tag counters that allow the lock-free adding and removing of pair—ref structures through the use of a DWCAS instruction. The counters prevent the ABA update problem.

The pair buffer struct is the header at the front of every pair—ref allocation buffer, and it is sized to take a cache line itself to maintain cache line alignment. The next pointer is used to maintain the push down stack linked list by pointing to the next buffer in the list. The max value is the total count of pair—ref instances in the buffer, and the current value is the last one that was allocated from the buffer. Once a pair—ref is initially allocated, it eventually is added to the avail list if it is freed and will always be reallocated from the avail list from that point on.

Figure 14:
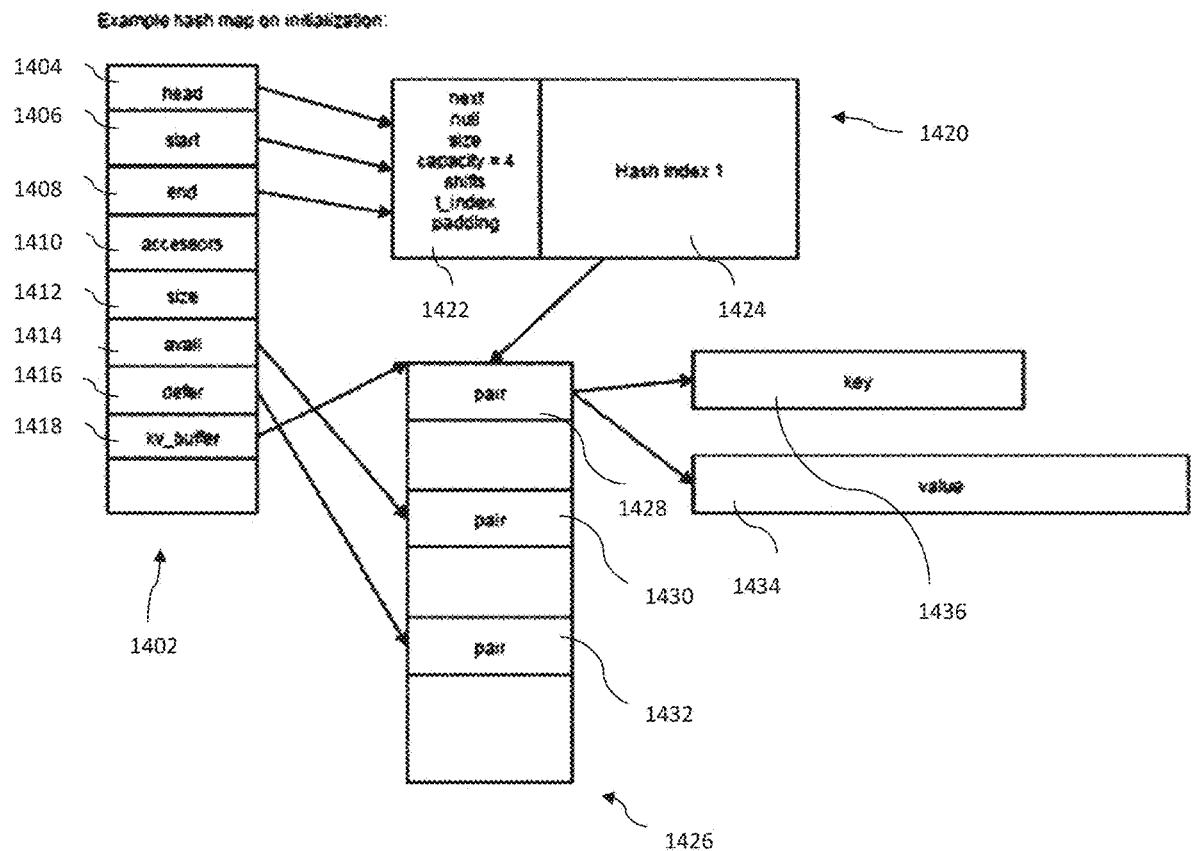
FIG. 14 illustrates an embodiment of the structures of a hash map defined by the code in FIG. 13.

FIG. 14 is a conceptual diagram of the relationship of the structures, and the code in FIG. 15 creates a basic hash map and also releases at a minimum a partially or wholly complete hash map. As shown in FIG. 14, the root structure is the hash map 1402, which has a number of additional fields defined relative to the hash set structure 302 previously described. In addition to the accessors field 1410, which acts as a reference count of accessing processes, there is the list of hash index structures maintained by head pointer 1404 and end pointer 1408 with the start pointer 1406 pointing to the first active hash index 1420, shown as hash index 1, in a list. The size 1412 is the total number of items contained in all the referenced hash indexes. The hash index 1420 may be similar to the one used for the hash set. However, in one embodiment, instead of using one 64 bit pointer slot for an update counter and another for a bit map, the hash map 1402 implementation shown in FIG. 14 combines them into a single 64 bit pointer slot to save space and increase the number of available slots.

Because the hash map 1402 tracks key/value pairs 1428, 1430, 1432, which cannot be stored in a hash index slot like the hash set, the hash index in this case always stores a pointer to a pair ref struct 1426, which takes 64 bytes to match a cache line on a 64-bit CPU to minimize cache sharing when updating a key/value pair. The kv_buffer pointer 1418 points to the last allocated pair ref buffer 1428 used to allocate pair ref structures as the first item in a linked list of buffers 1426 that acts essentially as a pushdown stack to track the buffers 1426. The defer pair list 1416 maintains a linked list of pair ref structures that have been removed from the hash map 1402, but still have active processes still referencing them. The avail pair list 1414 is the list of available pair ref structures that have no active references and can thus be reused. FIG. 14 shows the initial allocated hash index with an array of four blocks, with one slot in a block pointing to the first pair_ref in the pair buffer 1426 which has pointers to the key 1436 and value 1434. There is also an item on the avail list 1414 and an item on the defer list 1416.

Most key/value associative arrays, or maps, have a pretty basic set of primitives that make up their interface. The basic functions consist of "put" to add a value associated with a key, "get" to retrieve item associated with a key, and "remove" to delete an item associated with a key. When used with lock-free hash maps, these primitives have limitations in that both the "puts" and "removes" can be safely to originate from a unique source for any given key or that the update order doesn't matter and the last update always is the valid state. The reason for that restriction is that these basic functions, while performing all updates atomically, because of concurrency they cannot detect that another process has made changes to the state of the map since any possible query. Essentially all maps implement these basic operations and so do the embodiments described herein.

Before getting into the "put" algorithm, FIG. 16 is the function that computes the block index for any given key that is used in all the functions. It simply calls one of the functions from a library, such as for example the lookup3 library written by Bob Jenkins, which produces an integer from the key. The value returned is then masked off using the size of the array for the index to essentially perform a power of 2 modulo operation.

FIG. 17 is the result structure that is returned by the functions. The status returns an integer status value indicating the success or reason for failure of the operation. The value pointer is used for those functions that return the value. The state acts as a version number for the current value associated with the key and is not used in the basic functions. The next section which describes the multi-source update interface will describe how that field is used.

The hash_put function is presented in FIG. 18. The essence of the algorithm takes place between the increment and decrement of the accessors reference count in lines P11 and P72 respectively. The while loop from lines P12 to P70 is there to provide a simple mechanism for retrying the operation when needed as conflicting updates arise.

The do/while loop from line P16 to line P37 simply steps through the list of hash_index structures, computing the respective block for each index at line P17, and then scanning the block in the for loop on lines P22 to P35. The "if" statement at line P23 tests the respective bit in the bit map for that slot. If the slot is active, the ref to the pair_ref struct is loaded and passed to the update_existing function on line P26. If the update_existing returns something other than a NOT_FOUND status then the process breaks out of the for loop and will subsequently exit the do/while loop test on line P37. If the slot was not active on line P23, lines P30 through P33 check for an empty slot and record the first slot it finds, and the mask for current slot in the bit map is shifted before continuing at the top of the loop to examine the next slot in the block.

Line P38 checks for a success which means that the "put" succeeded in overwriting an existing item and breaks out of the outer while loop. Line P40 checks for a retry status and continues at the top of the while loop at P12.

The "if" statement at line P43 is executed if a matching item was not found in the block and tests if an empty slot was found in the block. Lines P44-P64 attempt to add an item to the empty slot. First a pair_ref is allocated and initialized at P44. On lines P50-P53, an attempt is made to atomically add the ref pointer to the empty slot and if not release the pair_ref struct and retry the "put" because another process grabbed the slot first. Lines P54-P60 attempt to update the bit map of active slots, and if it fails return the pair_ref struct and clear the slot because another process succeeded in updating the block. That means the "put" needs to be tried again because the key needs to be compared against the newly added item to the block. If the process reaches line P61 it has succeeded so increments size count and proceeds to exit the retry loop.

The process only reaches line P67 if no item matches and no empty slot is found in the block in which case it calls expand_index function to allocate a new, larger hash_index and start the incremental resizing operation. Line P71 calls the check resize function to see if there is a current resize taking place and aid the process by attempting to copy data to the larger hash_index. The call to check index on line P73 checks to see if it is safe to release any unused hash indexes or to advance the current start of active indexes.

FIG. 19 is the function update_existing referenced by hash_put that compares a key against an existing item and updates if there is a match. Lines U07 and U35 update the reference count for the key to prevent the key from being released if another process removes the item from the map concurrently. Line U12 performs the compare of the key with the key from the pair_ref structure. The test at U14 compares the passed in state and if it doesn't match returns an UPDATE_CONFLICT status along with the actual state value. Since the hash_put always passes in 0, the state is never compared and accordingly this path is never taken. Lines U21 through U31 attempt to update the value with the passed in value since the keys have matched, and a RETRY status is returned if it fails, otherwise, returns a SUCCESS status along the replace value and the current state.

If the hash_put function does not find a value and has an empty slot in the block, it allocates a new pair_ref structure on line P44 by calling the allocate_key_value function in FIG. 20. The outer retry while loop begins on line A07 and ends on line A39. Line A9 tests to see if there is an existing buffer, and if there is the first thing checked is the need to move items off the defer list to the avail list. The function is shown in FIG. 21, and it checks first on line D08 that if there is an item at the head of the list that the references to the key are now equal to zero before release the memory associated with the key D21 if the DWCAS removing it from pair_ref at line D16 succeeded. It then attempts to remove the reference from the head of the defer list at line D24 and adds it to the avail list on D25. FIG. 21 contains the generic list remove and list add, which are used to maintain both avail and defer lists, and the free_key_value function referred to on line D26.

After the defer list maintenance, the allocate_key_value function first checks if there slots in the buffer itself that are available in lines A13-A20. If no slots are available in the current buffer at the top of the buffer stack, it attempts to remove an item from the avail list if possible in lines A21-A28. If there is no buffer or no available pair_ref slots either in buffer or avail list, a new buffer is added lines A30-A38 and the loop retries to allocate a pair_ref until it succeeds.

The free_key_value in FIG. 21 attempts to remove the key pointer by atomically updating the key pointer and reference count with zero using the DWCAS on line F08 of FIG. 22, insuring that there are no active references since every accessing function should update reference count first. If the DWCAS fails, then there is an active reference that updated counter first, and the item is added to the defer list on line F17 also shown in FIG. 22. Otherwise, on successful completion, the pair_ref is cleared and the key is freed on lines F09-F13. It is then added to the avail list on F15, ready to be reallocated as needed.

The check_resize function called in hash_put on line P71 of FIG. 18 to perform the incremental resizing if needed, is shown in FIG. 23. All the accessing functions may call this check_resize function so that all calling processes aid in copying the items to the larger hash_index and the cost is amortized across multiple processes. The check_resize function simply checks that the hash_index at the start of the list has a next reference to another hash_index in the list and calls the transfer_block function.

The transfer_block function in FIG. 24 is nearly identical with the transferBlock function for the hash set in FIG. 10, with the exception that it calls the rehash function on line T32 and the new location information is returned in the rehash result struct instead of the arguments as was done with internal_add for the hash set.

The rehash function in FIG. 25 simply takes an existing pair_ref pointer and rehashes into to the current hash index. It computes the block index on line R10, and then scans the block in the for loop from line R14-R48. If it finds the pointer on line R16, a status of UPDATE_CONFLICT is returned. If it succeeds in adding to an empty slot on line R27 and then set the bit map on line R36, it returns a SUCCESS status on line R47. Line R49 tests to see if the entire block was scanned without finding an empty slot, in which case, lines R50-R67 simply expand the hash index again to accommodate the item.

The expand_index function shown in FIG. 26 is called by hash_put on line P57 in FIG. 18. It attempts to allocate and add an expanded hash index to the hash index list. If it fails because another process simultaneously expanded it already, it frees the allocation, and, if possible, advances the tail for the other process and returns SUCCESS.

The check_index_list function in FIG. 27 is called by hash_put function in FIG. 18 on line P73 and checks to see that that accessor count is zero, which means it should be safe to modify the hash index list pointers since there should be no active references. In the case of the start of the active index pointer, if on line L08 the size is zero, the transfer block function has transferred all items to a larger index and it attempts to advance the pointer. Lines L13 to L18 check if there are unused and unreferenced items in the list, and attempts to advance the head pointer and free the removed hash index.

Once a key/value pair has been added to the map, it is possible to retrieve the value pointer based upon the key by calling the hash_get function in FIG. 28. The do/while loop on lines G12 through G29 will step through all the active hash indexes in the index list. For the current index, the block is computed on line G14, and the for loop steps through the block on lines G16 through G27 comparing the keys at line G20. A successful compare returns the successful result on ling G22, otherwise, the mask for the bit map of active slots is advanced at G26 and the loop increments to next slot. If the entire block is scanned, the index pointer is advanced at G28 and the outer do/while loop continues to the next hash index. The check resize function call to perform incremental resize on line G32 was described with regard FIG. 23. So also, the check_index_list call on line G35 to update hash index list was previously described with regard to FIG. 27.

The compare_keys function called by the hash_get function on line G20 is presented in FIG. 29. Like the updated_existing function in FIG. 19, the function updates the reference count for the duration of the compare to prevent the key from being released concurrently while compare is taking place. If the compare succeeds on line C09, a successful result is returned, otherwise, the default NOT_FOUND status is returned.

The hash_remove function presented in FIG. 30 works essentially the same as the hash_get function in the way it steps through the hash index list with a do/while loop in lines R12-R44. Within the loop, the hash_remove function computes the block index for the current hash_index and it tests that the slot is active in the bit map and that there is a non-null pointer to the pair_ref structure. The same compare_keys function seen in FIG. 29 and as used in the hash_get function is called on line R21. If the key is found, line R25 attempts to update the bit map to deactivate the slot with the CAS call. The CAS failure indicates that a value in the block has been changed and lines R26-R32 reset the necessary variables to restart the scan of the block. The bit map being updated successfully allows the pointer to be cleared line R34 and the pair_ref returned on line R35, which results in a successful status to be returned. If no item was found the default NOT_FOUND status is returned. The function calls the previously described check_resize and check_index_list functions to perform operations related to incremental resizing.

A problem with concurrent hash maps, including those that use explicit locking, is that they have to insure that all updates for a given key occur originate with a unique process or, alternatively, simultaneous updates do not matter. The present disclosure provides an implementation that allows for simultaneous updates originating from multiple processes by providing the ability to uniquely add a key/value pair, and updates and deletes to specify the previous state or version of the item required for success. That means if another process updates the map between or after the current does a "get" and modifies the data, the process receives a status of UPDATE_CONFLICT so is aware of a simultaneous update and can retry the update operation. The update process mimics the pattern used in a CAS instruction where the previous value and the new value are provided, and the update only succeeds if the previous value is the current state.

So according to embodiments, an implementation may include a state or version counter with every result returned, which is provided with subsequent calls, thus allowing all concurrent updates by multiple processes to be detected and not depend on address pointers which could have been reused. In addition, by basing the state on a version counter, the ability to easily and safely synchronize updates between map instances that exist in different memory spaces is provided, either in separate processes or separate physical computers altogether.

The calls in this interface (hash_add, hash_update, hash_delete) are all similar in structure and function to their respective analogs of hash_put and hash_remove. The functions hash_add and hash_update are described in terms of their differences with respect to hash_put, and hash_delete is described in terms of its differences with respect to hash_remove. The addition of respecting the state associated with key is the only real difference in these functions.

The hash_add function shown in FIG. 31a-31b differs from the hash_put in a few respects. It scans the computed block in lines A17-A35, but, instead of calling update_existing on an active slot, it calls the compare_key function and breaks from the loop if keys match returning an UPDATE_CONFLICT status along with the existing state and current value so it only allows the addition of a unique key. Other than that, the compare_key function pretty much follows the form and function of the hash_put function.

The hash_update function in FIG. 32 updates an already existing item in the map so it returns a NOT_FOUND status if there is no matching key as the default. Like the hash_put function, it also calls on line U27 the update_existing function seen in FIG. 19, but with the difference that it passes the state argument to the update_existing function. The version count in the pair_ref always begins at 1 and if a value greater than 0 is passed to update_existing function, and it will return UPDATE_CONFLICT status if the status is greater than 0 and the status does not match the pair_ref version. The hash_put function always passes in a 0 so that if the keys match the version check is skipped and the item will be updated. Since this function will only update an existing item, it will not change the size of the current hash_index. The hash_delete function in FIG. 33 is nearly identical to the hash_remove function in FIG. 30. Essentially, it works the same with the exception of the pair_ref version being compared against the state argument in line D25.

While aspects the present disclosure have been described in terms of particular embodiments and illustrative figures, those of ordinary skill in the art will recognize that the invention is not limited to the embodiments or figures described. Some portions of the detailed description are presented in terms of procedures, steps, logic blocks, processing other symbolic representations of operations on data bits that can be performed on computer memory. Certain steps may be performed by some or all of hardware, software, firmware, or combinations thereof.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process, as well as performed sequentially.

Therefore, it should be understood that the aspects of the present disclosure can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A computer-implemented method of updating a hash table data structure in a thread-safe manner, the method comprising:
   storing a first hash index;
   storing a pair reference structure comprising at least one key/value buffer, the pair reference structure stored as a linked list of buffers; and
   storing a hash map structure, wherein the hash map structure tracks a key/value pair in the pair reference structure, and the hash index stores a pointer to the pair reference structure, and wherein the hash table data structure has a defer field that comprises a list of pair reference buffers that have been removed from the hash table data structure, wherein the removed buffers still have an active process referencing the hash table data structure.

* * * * *